(12) United States Patent
Bales

(10) Patent No.: US 7,786,187 B1
(45) Date of Patent: Aug. 31, 2010

(54) MOLD RESISTANT FIBER-FILLED THERMOPLASTIC COMPOSITES

(75) Inventor: Stephen G. Bales, Sewell, NJ (US)

(73) Assignee: Lords Additives LLC, Sewell, NJ (US)

(*) Notice: Subject to any disclaimer, the term of this patent is extended or adjusted under 35 U.S.C. 154(b) by 401 days.

(21) Appl. No.: 11/897,034

(22) Filed: Aug. 30, 2007

Related U.S. Application Data

(60) Provisional application No. 60/842,521, filed on Sep. 6, 2006.

(51) Int. Cl.
  *C08K 3/38* (2006.01)
  *C08K 3/08* (2006.01)
  *C08L 1/02* (2006.01)

(52) U.S. Cl. .......................... 523/122; 524/9; 524/404; 524/405

(58) Field of Classification Search .................. 523/98, 523/122; 524/9, 404, 405
See application file for complete search history.

(56) References Cited

U.S. PATENT DOCUMENTS

| | | | |
|---|---|---|---|
| 5,516,472 A | | 5/1996 | Laver |
| 6,676,745 B2 * | | 1/2004 | Merkley et al. ............. 106/726 |
| 6,939,903 B2 | | 9/2005 | Sigworth et al. |
| 7,163,974 B2 | | 1/2007 | Manning et al. |
| 7,258,826 B2 * | | 8/2007 | Bales ......................... 264/122 |
| 7,589,145 B2 * | | 9/2009 | Brant et al. .................. 524/515 |
| 2003/0021915 A1 * | | 1/2003 | Rohatgi et al. ................ 428/15 |

OTHER PUBLICATIONS

U.S. Appl. No. 10/681,497, Bales.
Steven Verhey, Peter Laks, Dana Richter, "Laboratory Decay Resistance of Wood fiber/Thermoplastic Composites", Forest Products Journal, vol. 51, Sep. 2001, p. 44-50.
Mark Mankowski and Jeffery J. Morrell, Patterns of Fungal Attack in Wood-Plastic Composites Following Exposure in a Soil Block Test, Wood and Fiber Science, Jul. 2000, p. 345-345.
David Pendleton, et al, "Durability of an Extended HDPE/Wood Composite", Forest Products Journal, vol. 52, Jun. 2002, p. 21-27.
Borogard ZB Technical Data Sheet, US Borax 3 pages.
PI Morris, Paul Cooper, "Recycled Plastic/Wood Composite Lumber Attached by Fungi", Forest Products Journal, Jan. 1998, p. 86-88.
Superior Court of New Jersey, Civil Action Aug. 24, 2004.
Dr Peter Laks, "Effect of Manufacturing Variables on Mold Susceptibility of Wood-Plastic Composites", Paper submitted to the 8th Intl Conference of Woodfiber-Plastic Composites, Forest Products Society, May 23, 2005.
Arkansas Business "Class Settlement in AERT Deck Cleaning Lawsuit" Jan. 19, 2009.

\* cited by examiner

*Primary Examiner*—Kriellion A Sanders

(57) ABSTRACT

The incorporation of a synergistic combination of a boron-containing fungicide and an anhydride-functional polyolefin coupling agent during the manufacture of lignocellulosic based thermoplastic materials significantly increases their resistance to surface impairment caused by mold. The preferred amount is about 0.5 to 3 percent by weight of the coupling agent and about 0.5 to 3 percent by weight of the boron containing fungicide.

18 Claims, No Drawings

MOLD RESISTANT FIBER-FILLED THERMOPLASTIC COMPOSITES

CROSS-REFERENCE TO RELATED APPLICATIONS

60/842,521 filed Sep. 6, 2006

FEDERALLY SPONSORED RESEARCH

None

SEQUENCE LISTING

None

BACKGROUND

This invention relates to fiber filled composites, and more particularly to thermoplastic, organic fiber-filled thermoplastic composites that have a high resistance to mold.

There is a very high demand for wood products. Although wood is a renewable resource, it takes many years for trees to mature. Consequently, the supply of wood suitable for use in construction is decreasing and there is a need to develop alternatives.

Organic fillers including lignocelluosic or cellulosic fiber materials such as wood, sawdust, rice hulls, and the like have long been added to thermoplastic resins such as polyethylene, polypropylene and polyvinyl chloride (PVC) to achieve a wood-like composite providing reinforcement, reduced coefficient of expansion, and cost reduction. Process methods have been developed to enable blends containing materials having low bulk density (ie. powders) and poor flow characteristics to be fed at commercially acceptable rates. Blends of this type can be extruded through dies of appropriate configuration to produce building product type shapes previously made from wood. When these thermoplastic composites were first introduced, the prevailing theory was that the plastic protected the fibers from fungal attack. However research by Verhey, Laks, and Richer, described in "Laboratory Decay Resistance of Woodfiber Thermoplastic Composites", Forest Products Journal, September 2001 revealed that fiber-filled thermoplastics are susceptible to damage from fungal decay. Degradation due to the fungal attack is a problem that threatens the material's structural integrity. In contrast, surface discoloration and spotting has been reported shortly after the introduction of thermoplastic composites. This visual degradation, caused by mold, is a significant problem since major commercial uses of organic fiber-filled thermoplastic composites, including decking and fencing, rely on their aesthetic appeal to compete in the marketplace. The problem is intensified since these products are directly exposed to the elements for years.

Traditionally, solid wood products are dipped or pressure treated with solutions of fungicides to provide resistance to fungus and mold damage. While this type of treatment is not practicable for a thermoplastic product, it is possible to incorporate a fungicide into the product during its manufacture. This approach provides a constant loading of fungicide throughout the material's thickness, increasing the resistance to leaching of the fungicide from the composite. However it diminishes surface concentration of the fungicide, reducing its effectiveness against surface mold attack.

Anhydrous borax, zinc borate and calcium borate have been identified as resisting fungal decay at relatively low levels, typically less than 1.5 percent, in both lignocellulosic compounds formed from small fractions of wood bonded with an adhesive binder of phenol-formaldehyde resin and thermoplastic lignocellulosic composites. Patent application Ser. No. 10/681,497 describes their use to resist surface impairment caused by mold a levels starting at 2 percent by weight. However there is a need to control the surface impairment in fiber-filled thermoplastic composites caused by mold more effectively at lower borate loading levels.

SUMMARY AND OBJECTIVES OF THE INVENTION

The present invention, which addresses the above need, is the incorporation of a synergistic combination of boron compounds and coupling agents to thermoplastic fiber-filled composites. More specifically it relates to the addition of a combination of boron-containing fungicides and anhydride-functional polyolefin coupling agents to economically increase the resistance of these thermoplastic composites to visual impairment of the product's surface caused by mold. Coupling agents are used to increase the bond strength of the lignocellulosic material and the thermoplastic resin. Several types of coupling agents have been identified in the production of thermoplastic, fiber-filled composites including organosilanes, long chained chlorinated paraffins, fatty acid derivatives, and acid or anhydride-functionalized polyolefins. However it was discovered that by using an anhydride-functional polyolefin coupling agent at levels as low as 0.5% by weight of the composite, boron-containing fungicide loadings as low as 0.3% by weight of the composite could provide effective mold resistance.

DETAILED DESCRIPTION

The organic fiber filled thermoplastic composites of this invention are produced by procedures that combine molten plastic with the organic fibers and additional additives such as lubricants, process aids, cross-linking agents, inhibitors, stabilizers, blowing agents, foaming agents and other additives known in the art. Examples of suitable thermoplastics include polyethylene (PE), high density polyethylene (HDPE), polystyrene (PS), and polyvinyl chloride (PVC). This process is further described in U.S. Pat. Nos. 5,516,472 (May, 1996) and 6,939,903 (September, 2005) the disclosures of which are incorporated herein by reference. Examples of suitable organic fibers include wood, ground rice hulls, kenaf, jute, coconut shells and grains at loadings from 20% to at least 80% by total weight of the composite. Other examples include biopolymer materials such as distiller's dried grain, dried starchy root crop, dried tubers and dried root, which may be incorporated at loadings from 5% to 95% by total weight of the composite.

The methods for manufacturing fiber filled thermoplastic composite will be dependent on the fiber type, the plastic resin, and the type or use of the composite desired. However, in general the raw materials are mixed together in a compounding process and the compounded material is then formed into the desired product. Compounding is the feeding and dispersing of fillers and additives, including the fungicide which is in powder form, into the molten polymer using either batch or continuous mixers. The compounded material then is either immediately pressed into the end product or formed into pellets for future processing.

As used in this invention, the term "boron-containing fungicide" includes zinc borate, calcium borate (both natural and synthetic), barium metaborate, sodium borate pentahydrate, anhydrous borax, boric acid, boric oxide or mixtures thereof.

The exact particle size of the boron-containing fungicide is not critical, but the material must be of a size that can be dispersed uniformly throughout the fiber-filled thermoplastic composite. Generally a mean particle size as large as 150 microns and as small as 1 micron can be used. For best results the mean particle size should be in the range of 40 microns to 5 microns.

The amount of boron-containing fungicide incorporated into the composite will depend on the organic fiber content, the coupling agent loading, the longevity desired and the anticipated exposure to moisture. However with anhydride-functionalized polyolefin coupling agent loadings of 0.5 percent by weight, boron-containing fungicide loadings as low as 0.3 percent by weight of the total composite can provide effective mold resistance. The preferred amount of boron containing fungicide is from about 0.5 to about 2 percent by weight of the total composite.

What is claimed is:

1. In the method for forming organic fiber-filled thermoplastic composite products such as to increase their resistance to surface visual impairment caused by mold, the improvement which comprises incorporating an amount of boron-containing fungicide selected from the group of calcium borate, barium metaborate, sodium borate pentahydrate, anhydrous borax, boric acid, or mixtures thereof in the range of about 0.3 to about 3 percent by weight of the total composite and an anhydride-functional polyolefin coupling agent prior to forming said composite product.

2. The method according to claim 1 in which said amount of anhydride-functional coupling agent is in the range from about 0.5 to about 3.0 percent by weight of said composite product.

3. In the method for forming organic fiber-filled thermoplastic composite products such as to increase their resistance to surface visual impairment caused by mold, the improvement which comprises incorporating a boron-containing fungicide selected from the group of calcium borate, barium metaborate, sodium borate pentahydrate, anhydrous borax, boric acid, or mixtures thereof in the range from about 0.5 to about 2 percent by weight of the total composite product and an anhydride-functional polyolefin coupling agent from about 0.5 to about 3.0 percent by weight of the total composite product prior to forming said composite product.

4. In the method for forming organic fiber-filled thermoplastic composite products such as to increase their resistance to surface visual impairment caused by mold, the improvement which comprises incorporating zinc borate in the range from about 0.5 to about 2 percent by weight of the total composite product and an anhydride-functional polyolefin coupling agent from about 0.5 to about 3.0 percent by weight of the total composite product prior to forming said composite product.

5. The method according to claim 3 in which said boron-containing fungicide is zinc borate.

6. The method according to claim 3 in which said boron-containing fungicide is selected from the group of sodium pentahydrate, anhydrous borax or mixtures thereof.

7. The method according to claim 3 in which said boron-containing fungicide is anhydrous borax.

8. The method according to claim 3 in which said boron-containing fungicide is calcium borate.

9. The method according to claim 8 where said calcium borate is a naturally occurring borate.

10. The method according to claim 9 where said calcium borate is selected from the group consisting of calcium polytriborate, calcium hexaborate, calcium-sodium borate, calcium-magnesium borate and calcium metaborate.

11. The method according to claim 8 where said calcium borate is a synthetic borate.

12. The method according to claim 3 in which said thermoplastic material is selected from the group consisting of polyethylene, high-density polyethylene, polystyrene, and polyvinyl chloride.

13. The method according to claim 3 in which said thermoplastic material is polyethylene or high density polyethylene.

14. The method according to claim 3 in which said fiber material is selected from the group consisting of wood, ground rice hulls, kenaf, jute, coconut shells, and flax.

15. The method according to claim 3 in which said fiber material is selected from the group consisting of distiller's dried grain, distiller's dried starchy root crop, distiller's dried tuber and distiller's dried root.

16. The method according to claim 3 in which said fiber material is wood.

17. The method according to claim 3 in which said anhydride-functional polyolefin coupling agent is a maleic anhydride modified polyethylene.

18. The method according to claim 3 in which said anhydride-functional polyolefin coupling agent is a maleic anhydride modified polypropylene coupling agent.

* * * * *